(12) United States Patent
Sakurai et al.

(10) Patent No.: US 7,903,155 B2
(45) Date of Patent: Mar. 8, 2011

(54) IMAGE CAPTURING APPARATUS AND PROGRAM

(75) Inventors: Mikio Sakurai, Takatsuki (JP); Yoshihiro Hara, Kishiwada (JP)

(73) Assignee: Konica Minolta Holdings, Inc., Tokyo (JP)

( * ) Notice: Subject to any disclaimer, the term of this patent is extended or adjusted under 35 U.S.C. 154(b) by 624 days.

(21) Appl. No.: 11/287,934

(22) Filed: Nov. 28, 2005

(65) Prior Publication Data

US 2006/0114340 A1 Jun. 1, 2006

(30) Foreign Application Priority Data

Nov. 30, 2004 (JP) .................................. 2004-346150

(51) Int. Cl.
*H04N 3/14* (2006.01)
*H04N 5/228* (2006.01)

(52) U.S. Cl. .................................. 348/272; 348/208.13

(58) Field of Classification Search ............... 348/218.1, 348/364, 208.99, 294, 362, 208.13, 271–283; 382/284

See application file for complete search history.

(56) References Cited

U.S. PATENT DOCUMENTS

| | | | | |
|---|---|---|---|---|
| 5,402,171 A | * | 3/1995 | Tagami et al. | 348/219.1 |
| 6,393,162 B1 | * | 5/2002 | Higurashi | 382/284 |
| 6,650,361 B1 | * | 11/2003 | Shiomi | 348/218.1 |
| 7,345,704 B2 | * | 3/2008 | Sakaguchi | 348/282 |
| 7,411,626 B2 | * | 8/2008 | Ueda | 348/364 |
| 2004/0160525 A1 | * | 8/2004 | Kingetsu et al. | 348/364 |

FOREIGN PATENT DOCUMENTS

JP 2002-112007 4/2002

* cited by examiner

*Primary Examiner* — David L Ometz
*Assistant Examiner* — Ahmed A Berhan
(74) *Attorney, Agent, or Firm* — Sidley Austin LLP

(57) ABSTRACT

An image capturing apparatus includes: an image pickup device in which photoelectric conversion elements corresponding to color components are arranged in a predetermined pattern; an acquisition unit that successively acquires a plurality of images by using the image pickup device; a detector that detects a positional deviation among the plurality of images; and a synthesis unit that compensates the positional deviation to synthesize the plurality of images by addition, wherein the synthesis unit adds the plurality of images in a state where the images have the same color layout as that of the photoelectric conversion elements in the image pickup device.

14 Claims, 10 Drawing Sheets

F I G . 1
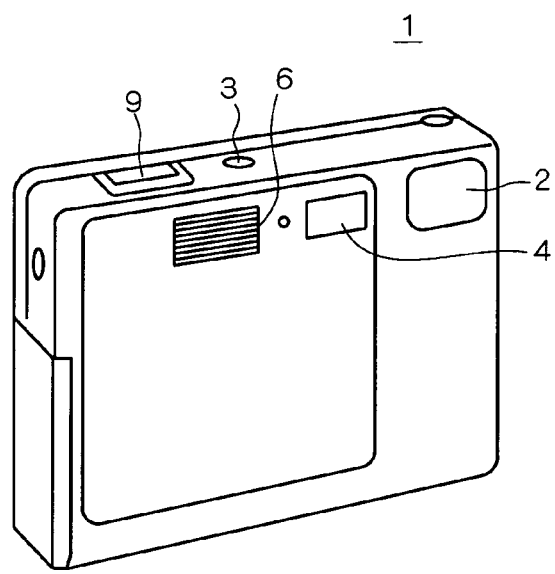
F I G . 2
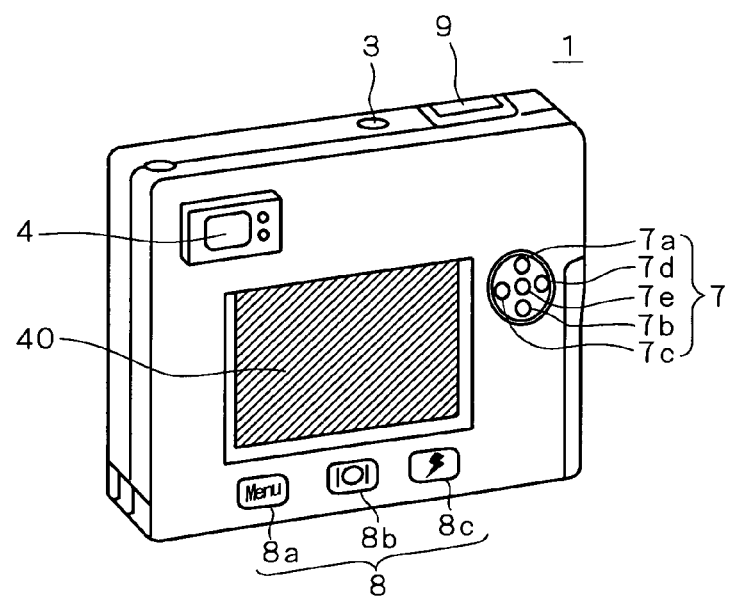

F I G . 4
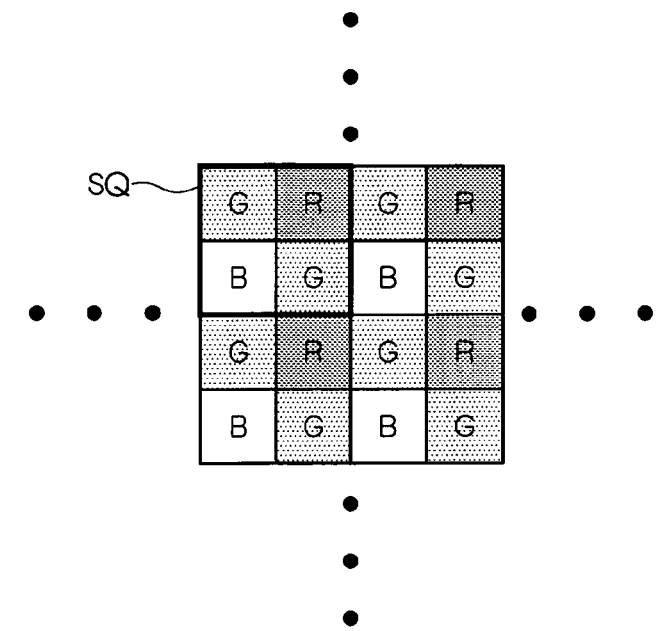
F I G . 5
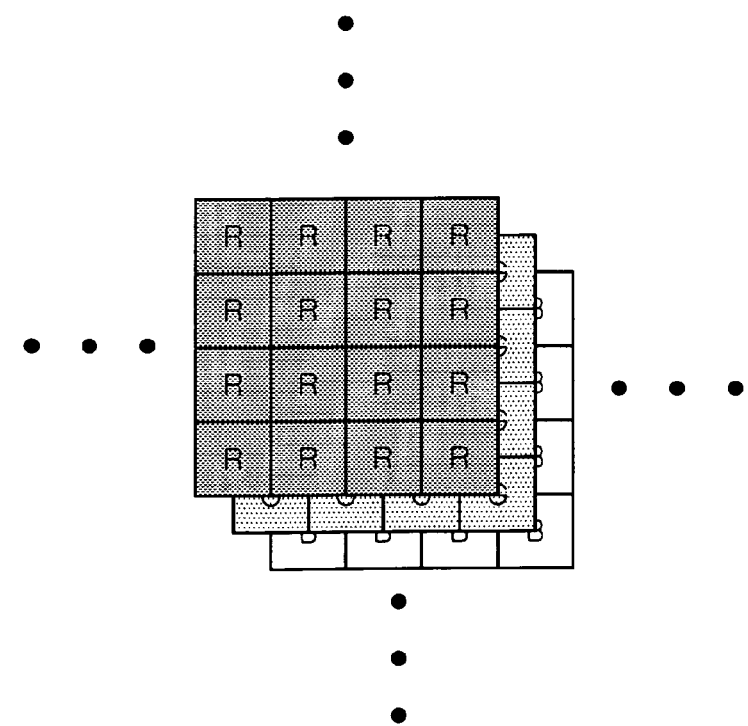

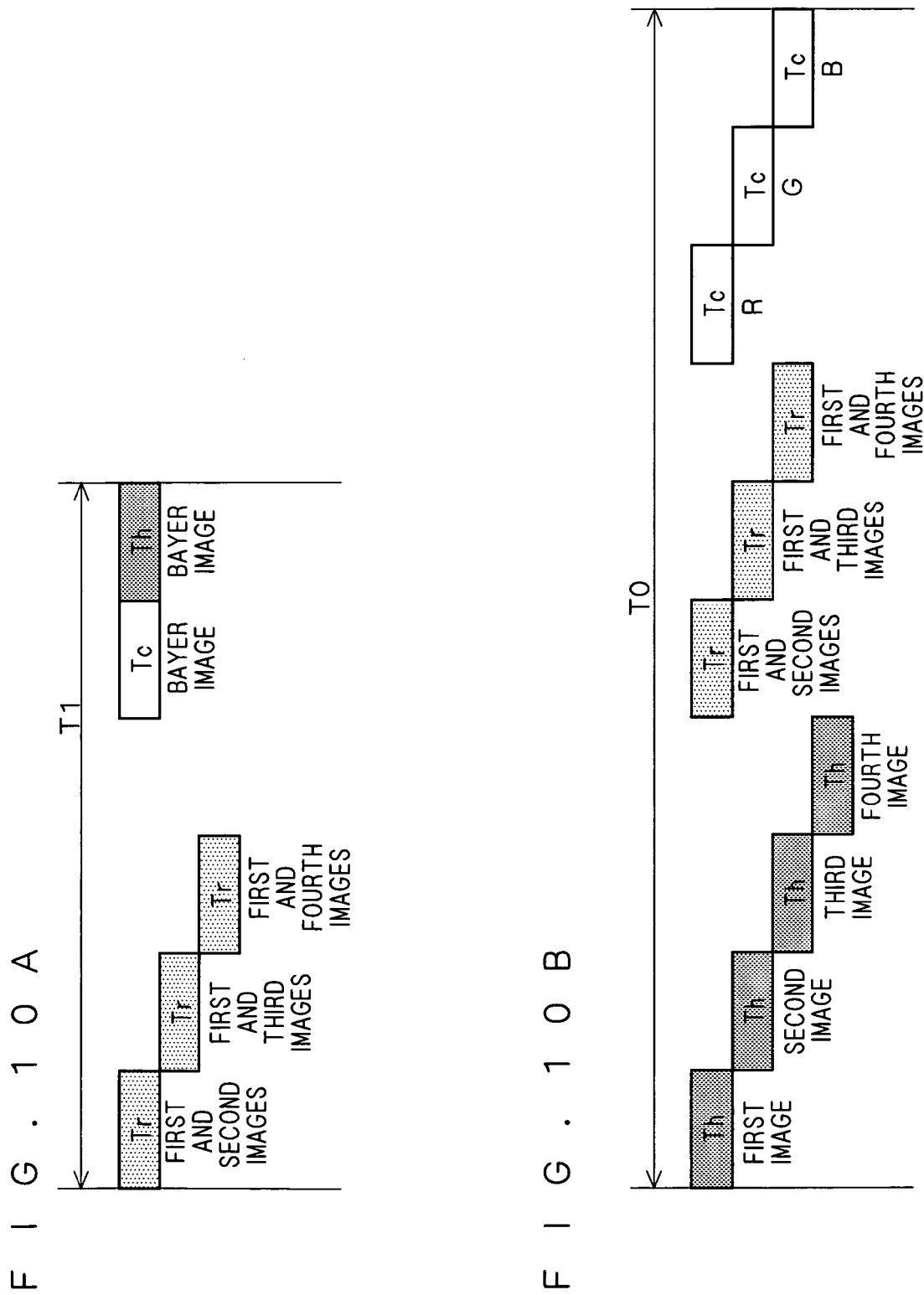

F I G . 1 1
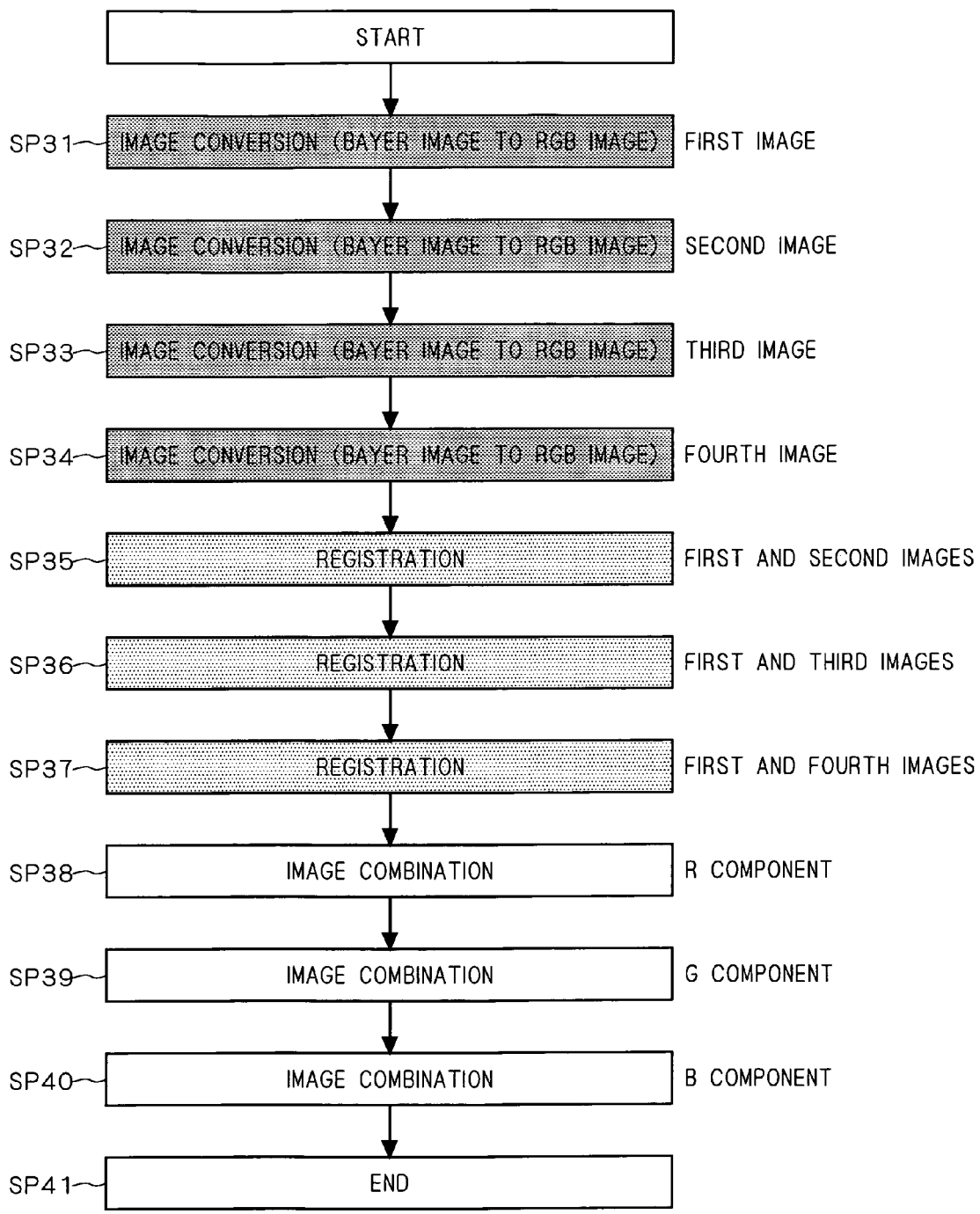

IMAGE CAPTURING APPARATUS AND PROGRAM

This application is based on application No. 2004-346150 filed in Japan, the contents of which are hereby incorporated by reference.

BACKGROUND OF THE INVENTION

1. Field of the Invention

The present invention relates to a technique for correcting a handshake in an image capturing apparatus, in particular, a handshake correcting technique of an image-adding-type.

2. Description of the Background Art

One of techniques for correcting a handshake in an image capturing apparatus is a handshake correcting technique of an image-adding-type.

In the handshake correcting technique of the image-adding-type, first, a plurality of images for handshake correction are successively captured by an image pickup device (such as a CCD sensor). Deviations of the subject position among the plurality of images are compensated, and corresponding pixels in the plurality of images in which the positional deviations are compensated are added, thereby generating a synthesized image (still image) obtained by synthesizing the plurality of images. According to the technique, by synthesizing a plurality of images by addition which is accompanied by suppression of movement of the subject by making exposure time per image relatively short to minimize movement of the subject during exposure, a sufficient exposure amount can be assured. As a result, a still image in which a handshake is corrected can be obtained.

One of techniques for shortening image process time in image synthesis process is a technique for synthesizing images by using characteristics of three color components (R (red) component, G (green) component, and B (blue) component) in images (refer to, for example, Japanese Patent Application Laid-Open No. 2002-112007). This publication discloses a technique for performing a synthesis process using mainly the G component.

However, the above positional deviation compensating technique is carried out by using an image (RGB image) obtained by a process (color interpolating process) for converting a Bayer matrix image to an RGB image. The "Bayer matrix image" is an image having the same pixel matrix as that of an image pickup device 5 having a Bayer matrix, and the "RGB image" is an image having R, G, and B components for each of pixels.

The number of RGB images after the converting process becomes three times as many as Bayer matrix images. There is, consequently, a problem such that a process load in the positional deviation compensation is heavy.

Even if efficiency is improved by applying the technique of the aforementioned publication to the handshake correcting technique, as long as the synthesis process is performed by using RGB images which are three times as many as Bayer matrix images, improvement in efficiency of image process is limited.

SUMMARY OF THE INVENTION

An object of the present invention is to provide a technique capable of improving the efficiency of a handshake correcting process of an image-adding-type.

In order to achieve the object, according to a first aspect of the present invention, the image capturing apparatus includes: an image pickup device in which photoelectric conversion elements corresponding to color components are arranged in a predetermined pattern; an acquisition unit that successively acquires a plurality of images by using the image pickup device; a detector that detects a positional deviation among the plurality of images; and a synthesis unit that compensates the positional deviation to synthesize the plurality of images by addition. Herein, the synthesis unit adds the plurality of images in a state where the images have the same color layout as that of the photoelectric conversion elements in the image pickup device.

With this configuration, a plurality of images having the same color layout as that of the photoelectric conversion elements are synthesized by addition. Consequently, as compared with the case where a process for converting each of the plurality of images to color component images is performed and, after that, resultant images are synthesized for each color component, the load of the synthesis process can be reduced.

Further, the present invention is also directed to a computer software product.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic perspective view from the front side of an image capturing apparatus;

FIG. 2 is a schematic perspective view from the rear side of the image capturing apparatus;

FIG. 4 is a diagram showing a Bayer matrix image before an interpolating process;

FIG. 5 is a diagram showing an RGB image after the interpolating process;

FIGS. 10A and 10B are diagrams illustrating reduction in process time;

FIG. 11 is a flowchart showing the flow of handshake correcting control in a comparative example.

DESCRIPTION OF THE PREFERRED EMBODIMENTS

Figure 3:
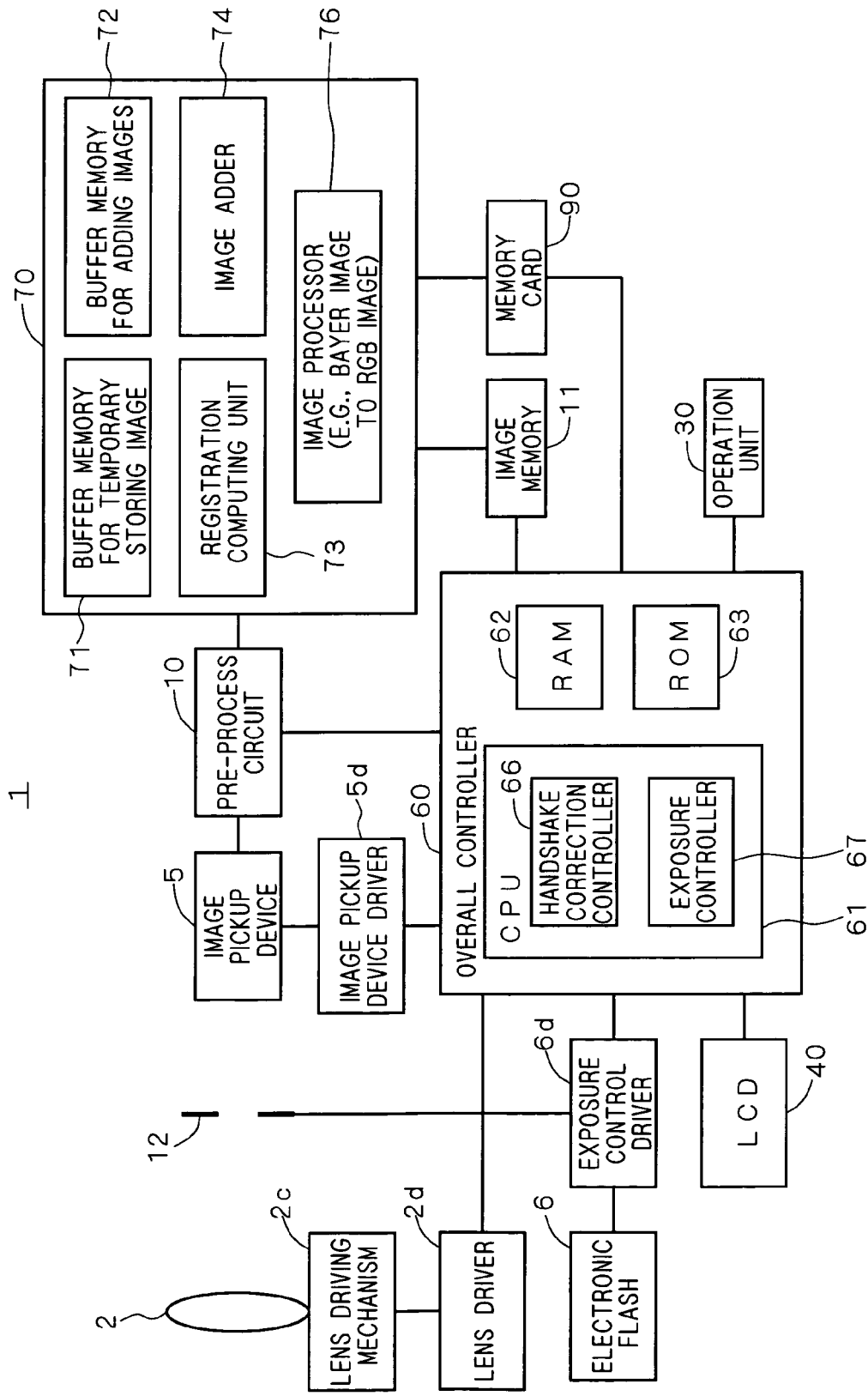
FIG. 3 is a block diagram showing the internal functions of the image capturing apparatus.

Preferred embodiments of the present invention will be described below with reference to the drawings.

A. Outline of Configuration

FIG. 1 is a diagram showing the external configuration of an image capturing apparatus 1. FIG. 1 is a schematic perspective view from the front side, and FIG. 2 is a schematic perspective view from the rear side.

As shown in FIG. 1, the image capturing apparatus 1 has a taking lens 2, an optical viewfinder 4, and an electronic flash 6 on its front side, and has a power source button 3 and a shutter start button (release button) 9 on its top face side. As shown in FIG. 2, the image capturing apparatus 1 has a liquid crystal display (hereinafter, referred to as LCD) 40 and button groups 7 and 8 on its rear side. The button group 7 is constructed by cross cursor buttons 7a to 7e (hereinafter also referred to as an up button 7a, a down bottom 7b, a left button 7c, a right button 7d, and a center (execution) button 7e). The button group 8 is constructed by a menu button 8a, a liquid crystal monitor button 8b, and an electronic flash mode button 8c.

The image capturing apparatus 1 obtains image data of a subject by, for example, photoelectrically converting a subject image from the taking lens 2 by the image pickup device 5.

The power source button 3 is used to accept a power-on operation and a power-off operation. Concretely, each time the power source button 3 is depressed, the state shifts alternately between the on state and the off state.

The shutter start button 9 is a two-level press switch capable of detecting a half-pressed state (hereinafter, also referred to as S1 state) and a depressed state (hereinafter, also referred to as S2 state) set by the user (operator) so as to be distinguished from each other. In the half-pressed (S1) state, an automatic focus control or the like starts. In the depressed (S2) state, an image capturing operation for capturing an image to be recorded starts.

The LCD 40 performs preview display (also referred to as live view display) before the image capturing operation, reproduction display of a recorded image, and the like. The LCD 40 has a predetermined number (herein, 320×240) of display pixels and can display a color image.

In the live view display, after power-on of the image capturing apparatus 1 or after completion of image capturing, image capturing of a subject in low resolution is repeated at small time intervals (for example, every 1/30 sec), and a captured image is displayed as a motion image on the LCD 40. The operator can perceive the position, size, and the like of the subject in a captured image from the live view display on the LCD 40 and perform framing operation. The framing operation can be also performed by using only the optical viewfinder 4 without using the LCD 40.

B. Internal Configuration

With reference to FIG. 3, the internal configuration of the image capturing apparatus 1 will be described. FIG. 3 is a block diagram showing the internal functions of the image capturing apparatus 1.

B1. Image Pickup Device 5

The image pickup device 5 has the function of capturing an optical image of a subject (that is, subject image) formed by the taking lens 2 and generating an electronic image signal.

The image pickup device 5 is a single plate-type CCD sensor having a color filter array. In the image pickup device 5, a number of (for example, 1600×1200) photodiodes (photoelectric converting elements) for performing photoelectric conversion are arranged two-dimensionally in matrix and correspond to pixels. Each of the pixels is covered with a color filter of any of primary color components (R (red), G (green), and B (blue)).

Herein, as shown in FIG. 4, the image pickup device 5 having a Bayer color filter array is employed. In the Bayer CCD sensor, filters of the G component largely contributing to a brightness signal are arranged in a checkered state, and filters of R and B components are disposed in a checkered state in the remaining part. In the image pickup device 5, photoelectric converting elements corresponding to the color components (R, G, and B) are disposed in a predetermined pattern. Specifically, units SQ each having a 2×2 pixel size constructed by four pixels of (G, R, B, and G) are repeatedly disposed in two-pixel units (cycles) in both of the X and Y directions.

In each of pixels disposed in such a manner, charges corresponding to any of primary color components of R, G, and B are accumulated. The charges accumulated in the image pickup device 5 are sequentially taken out line by line and output as electric signals.

Other than the type shown in FIG. 4, there are some types of Bayer CCD sensors such as a type in which pixels of G are arranged in the vertical direction. Further, the present invention is not limited to the Bayer CCD sensor but can be also applied to CCD sensors of various types. The present invention can be applied not only to the CCD sensor but also to image sensors of other kinds such as a CMOS sensor.

B2. Pre-Process Circuit 10

An image signal obtained from the image pickup device 5 is supplied to a pre-process circuit 10. The pre-process circuit 10 has an analog signal processing circuit and an A/D converter. In the analog signal processing circuit, a predetermined analog signal process is performed on an image signal (analog signal). Concretely, the analog signal processing circuit has a correlated double sampling circuit (CDS) and an auto gain control circuit (AGC). A process for reducing noise in an image signal is performed by the correlated double sampling circuit, and the level of the image signal is adjusted by adjusting the gain by the auto gain control circuit. The A/D converter converts pixel signals of the image signal to a digital signal of a predetermined number of bits (for example, 12 bits). The digital signal after the A/D conversion is temporarily stored as image data in the Bayer matrix (hereinafter, also simply referred to as "Bayer matrix image") into a buffer memory 71. The color layout in the pixel arrangement of a Bayer matrix image is the same as that in the photoelectric conversion element arrangement in the image pickup device 5. In short, the Bayer matrix image has a configuration similar to that of a so-called RAW image.

B3. Digital Processor 70

The image capturing apparatus 1 has, as image capturing modes, an image capturing mode which does not accompany handshake correction control (hereinafter, also referred to as "normal image capturing mode") and an image capturing mode accompanying the handshake correction control (hereinafter, also referred to as "handshake correcting mode").

In the normal image capturing mode, an interpolating process (color interpolating process), a γ correcting process, a WB (white balance) correcting process, a noise reducing process, a compressing process, and the like are performed on the Bayer matrix image captured by the image pickup device 5 and stored in the buffer memory 71 by a digital processor 70.

As will be described later, in the handshake correcting mode, a plurality of Bayer matrix images captured by the image pickup device 5 are stored in the buffer memory 71. By the digital processor 70, a process for detecting a positional deviation among the plurality of Bayer matrix images is performed and, in addition, a synthesis process is performed for synthesizing the plurality of Bayer matrix images in a buffer memory 72 by addition, which is accompanied by a positional deviation compensating process on the plurality of Bayer matrix images. The digital processor 70 also performs the interpolating process, γ correcting process, WB correcting process, noise reducing process, compressing process, and the like also in the handshake correcting mode. The processes are executed by properly using an image memory 11. The captured images subjected to the processes are stored in a memory card 90.

The digital processor 70 has the buffer memories 71 and 72, a positional deviation computing unit (registration computing unit) 73, an image adder 74, and an image processor 76.

The buffer memories 71 and 72 are constructed by semiconductor memories (for example, DRAMs) which can be accessed at high speed. The buffer memory 71 is a buffer memory for temporary storing images and has capacity that stores a plurality of (for example, four) Bayer matrix images. The buffer memory 72 is a buffer memory for the image adding process in the handshake correcting control and has capacity that stores one Bayer matrix image.

The positional deviation computing unit 73 is a computing unit that computes a positional deviation amount in a plurality of images. The image adder 74 is a processor that compensates the positional deviation among the images detected by the positional deviation computing unit 73 to add the plurality of images stored in the buffer memory 71 by using the buffer memory 72.

The image processor 76 is a processor that performs various digital image processes such as the interpolating process, WB correcting process, γ correcting process, noise reducing process, compressing/decompressing process.

The interpolating process (color interpolating process) is a process for estimating information of color components other than the color component actually obtained by a photoelectric converting element in the position of each of the plurality of pixels (photoelectric conversion elements) in the image pickup device 5 on the basis of the values of pixels in the periphery. Since each of the pixels in the image pickup device 5 has information of only one of the primary color components of R, G, and B, by such an interpolating process, color components which are insufficient at each position are compensated by such an interpolating process. The interpolating process is also expressed as a complementing process for making up for insufficient color components (color information) at each pixel position (position of each photoelectric converting element).

By the interpolating process, information regarding a value of each component of R, G, and B in a predetermined bit depth (for example, 12 bits) is given to each pixel. For example, information of the primary color components of "G" and "R" in the position of "B" in four pixels in the unit SQ of FIG. 4 is obtained by interpolation. The information of the primary color component of "G" in the position can be obtained by, for example, computing an average value of four G components adjacent to the component of B in the vertical and horizontal directions. The information of the primary color component of "R" in the position can be obtained by, for example, computing an average value of four R components obliquely adjacent to the component of B, that is, the R components which are off to the upper right, upper left, lower right and lower left of the component of B. Information in the other positions is obtained similarly.

In such a manner, the image processor 76 performs the interpolating process using image signals of pixels in the proximity of each pixel and outputs image data (hereinafter, also referred to as "RGB image") of three-primary-color components (R component, G component, and B component) of each pixel (refer to FIG. 5). FIG. 5 is a diagram conceptually showing the RGB image. The interpolating process is also expressed as a converting process for converting a Bayer matrix image to an RGB image. The color layout in the RGB image in which all of color components are disposed at pixel intervals is different from that in the Bayer image. That is, the interpolating process is also expressed as a converting process for converting a state in which the same color layout as that of photoelectric converting elements in the image pickup device 5 is used to a state where color layout different from that of the photoelectric converting elements in the image pickup device 5 is used.

The γ correcting process is a process for correcting the tone of pixel data, and the WB correcting process is a process for shifting the level of each of the color components R, G, and B and adjusting the color balance. The noise reducing process is a process for removing noise from an image. The compressing/decompressing process is an image data compressing process and an image data decompressing process. As the compression format, the JPEG format or the like is employed.

After performing the interpolating process, the image processor 76 performs the γ correcting process, the WB correcting process, the noise reducing process, and the compressing process, thereby generating a captured image. The captured image generated is stored in the memory card 90.

B4. Overall Controller 60

The overall controller 60 is constructed by a microcomputer having therein a CPU 61, an RAM 62, and a ROM 63. The microcomputer executes a predetermined program to thereby control the components in a centralized manner. The RAM 62 is a semiconductor memory (such as DRAM) which can be accessed at high speed, and the ROM 63 is an electrically rewritable nonvolatile semiconductor memory (such as flash ROM).

The overall controller 60 includes a handshake correction controller 66, an exposure controller 67, and the like. The controllers 66 and 67 are function units realized when the microcomputer executes a predetermined program.

The handshake correction controller 66 performs an image-adding-type handshake correcting control in cooperation with the digital processor 70. The handshake correcting control in this preferred embodiment is realized by compensating positional deviations of a subject among a plurality of Bayer matrix images successively captured by the image pickup device 5, and synthesizing the plurality of Bayer matrix images, thereby generating a synthesized image. The process for generating a synthesized image is performed by using images having the same color layout as that of the photoelectric converting elements in the image pickup device 5, that is, Bayer matrix images.

The exposure controller 67 determines shutter speed (exposure time), an f-number (an aperture value), and a gain set value of auto white balance at the time of image capturing on the basis of luminance information of a subject read by the image pickup device 5.

The overall controller 60 performs an automatic focusing operation and a zoom magnification changing operation (also referred to as a view angle changing operation and a focal length changing operation) by driving the focus lens and the zoom lens in the taking lens 2 via a lens driver 2d and a lens driving mechanism 2c. The overall controller 60 also controls the f-number of an aperture 12 and light emission of the electronic flash 6 via an exposure control driver 6d, and controls shutter speed (exposure time) in the image pickup device via an image pickup device driver 5d, thereby performing an automatic exposure controlling operation and the like.

B5. Operation Unit 30

An operation unit 30 includes the power source button 3, button groups 7 and 8, and shutter start button 9 and is used when the user performs an operation of changing a setting state of the image capturing apparatus 1, an image capturing operation, and the like.

C. Outline of Operation

Figure 6:
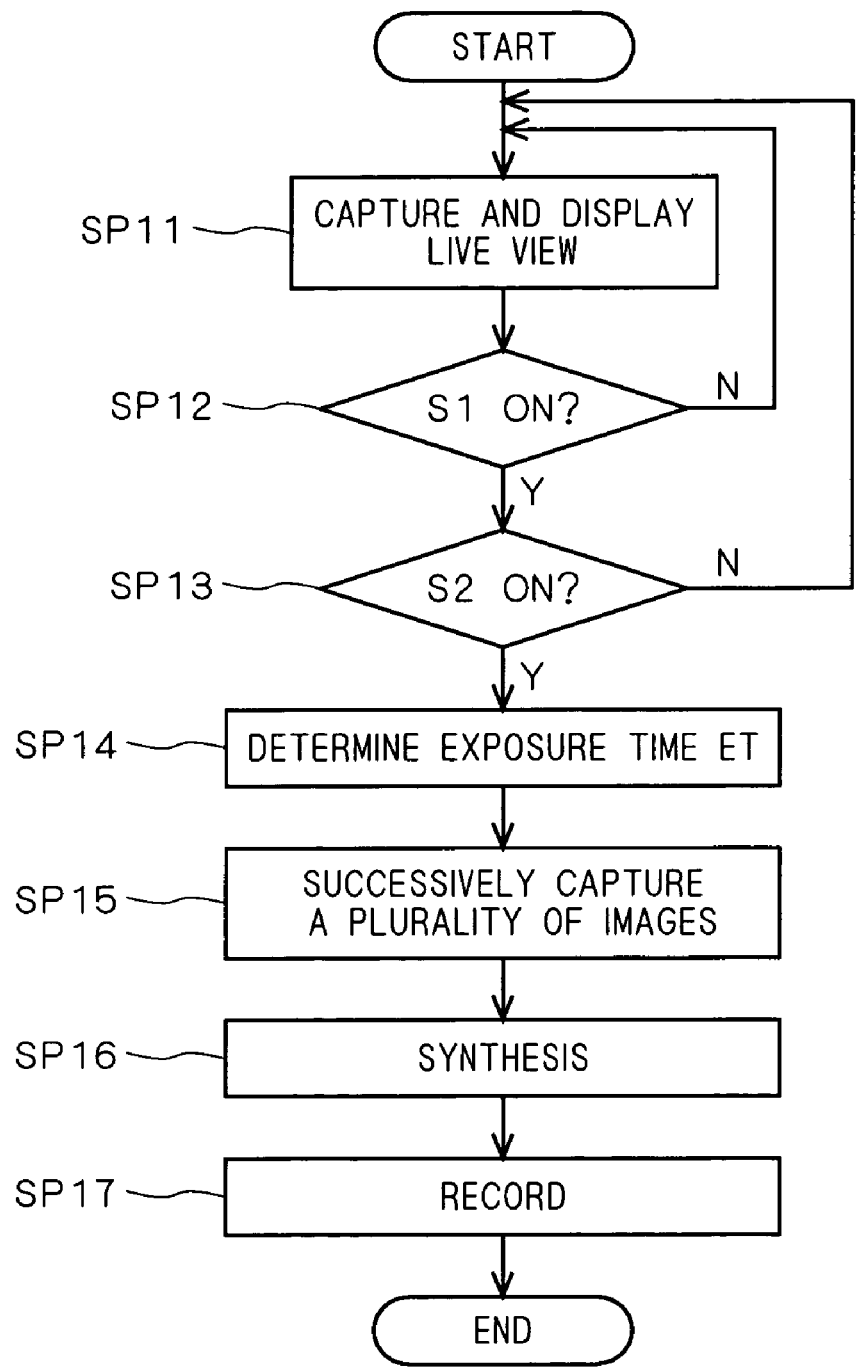
FIG. 6 is a flowchart showing the flow of an image capturing process.

FIG. 6 is a flowchart showing the flow of an image capturing process under the handshake correcting control. With reference to FIG. 6, the image-adding-type handshake correcting process will be described. It is assumed herein that four images PA1 to PA4 are successively captured and, then, are synthesized, thereby generating a synthesized image. It is also assumed herein that, prior to the operations of the flowchart of FIG. 6, an instruction of performing an image capturing operation in the handshake correcting mode is preset by a predetermined operation using the button groups 7 and 8 or the like.

First, live view images are captured by the image pickup device 5 and the like at predetermined time intervals and displayed on the LCD 40 (step SP11). During the display, the state of the shutter start button 9 is determined (steps S12 and S13). When the depressed state S2 is determined, the program advances to step SP14. In steps SP14 to SP17, in response to the shutter start button 9 which enters the depressed state S2, an image capturing operation accompanying the image-adding-type handshake correcting control is performed.

First, in step SP14, exposure time ET of each image is set to a proper value, concretely, a value of 1/f (sec) or less. Herein, "f" denotes the focal length (unit: mm (millimeters)) of the taking lens 2. The focal length f is a 35-mm film-equivalent focal length.

For example, when the focal length f is 30 mm, the exposure time ET is set to 1/30 seconds. By setting the exposure time ET to such a relatively small value, a blurring of each image captured in step SP 15 can be prevented.

In step SP15, an operation of successively capturing the four images PA1 to PA4 used for handshake correction is performed. The captured four images PA1 to PA4 are temporarily stored in the buffer memory 71.

In step SP16, a subject positional deviation correction or the like is performed on the basis of the four images PA1 to PA4. After that, a synthesized image of the four images PA1 to PA4 is generated as a captured image.

In step SP17, the generated synthesized image is stored in the memory card 90.

In such a manner, the captured image subjected to the handshake correction can be obtained.

D. Handshake Correcting Operation

Figure 7:
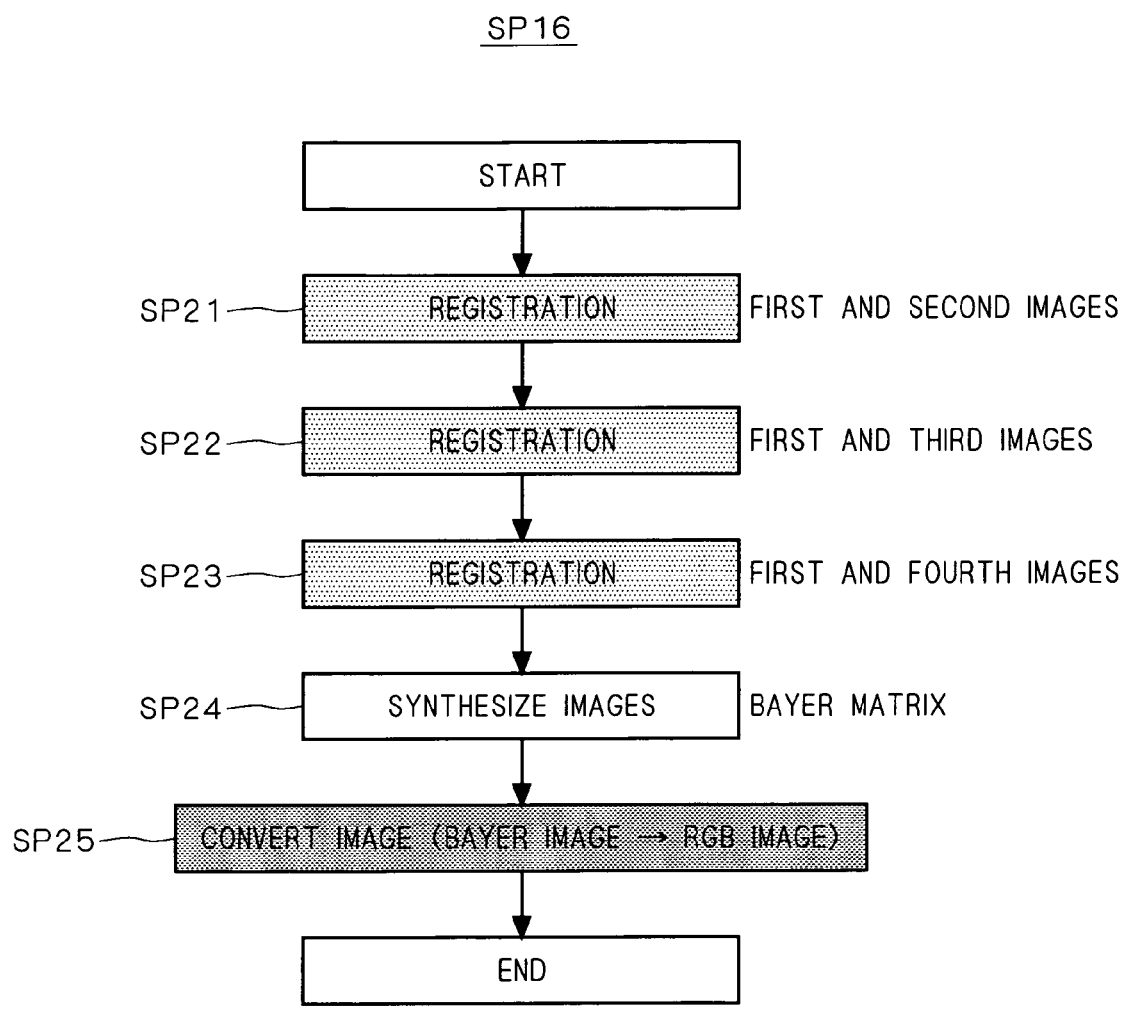
FIG. 7 is a flowchart showing the flow of a handshake correcting control.
Figure 8:
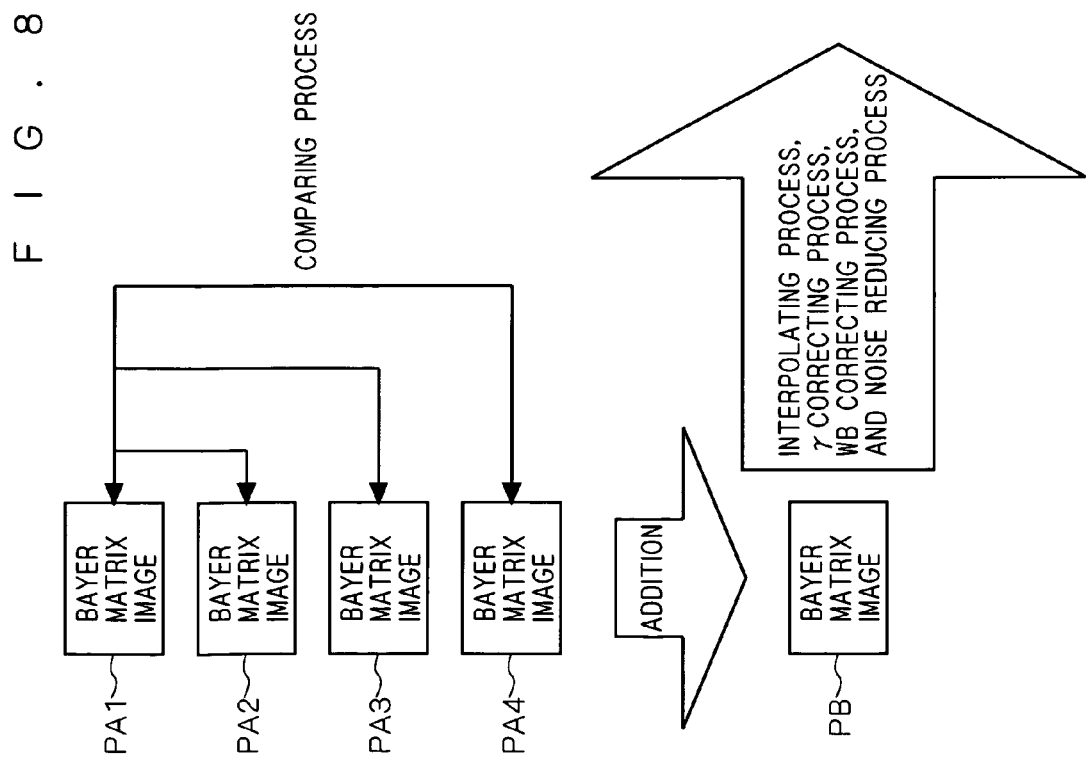
FIG. 8 is a conceptual diagram showing an outline of the handshake correcting control.

The image-adding-type handshake correcting control (step SP16) will be further described with reference to FIGS. 7 and 8 and the like. FIG. 7 is a flowchart showing the detailed operation in step SP16, and FIG. 8 is a conceptual diagram showing operations until a synthesized image (RGB image) PD is generated on the basis of the four images (Bayer matrix images) PA1 to PA4.

As shown in FIG. 7, first, a positional deviation among the captured plurality of images (Bayer matrix images) PA1 to PA4 is detected in steps SP21 to SP23. The case of detecting a positional deviation by comparing the Bayer matrix images PA1 to PA4 with each other will be described here. In this case, a simpler configuration as compared with that in the case of separately providing a gyro sensor for detecting a positional deviation (which will be described later) can be used.

Concretely, first, two images PA1 and PA2 are selected as images PE1 and PE2 to be compared. Next, the two images PA1 and PA3 are selected as the images PE1 and PE2 to be compared. Finally, the two images PA1 and PA4 are selected as the images PE1 and PE2 to be compared.

Specifically, first, a positional deviation between the first image PA1 and the second image PA2 is detected in step SP21. In step SP22, a positional deviation between the first image PA1 and the third image PA3 is detected. In step SP23, a positional deviation between the first image PA1 and the fourth image PA4 is detected.

Figure 9:
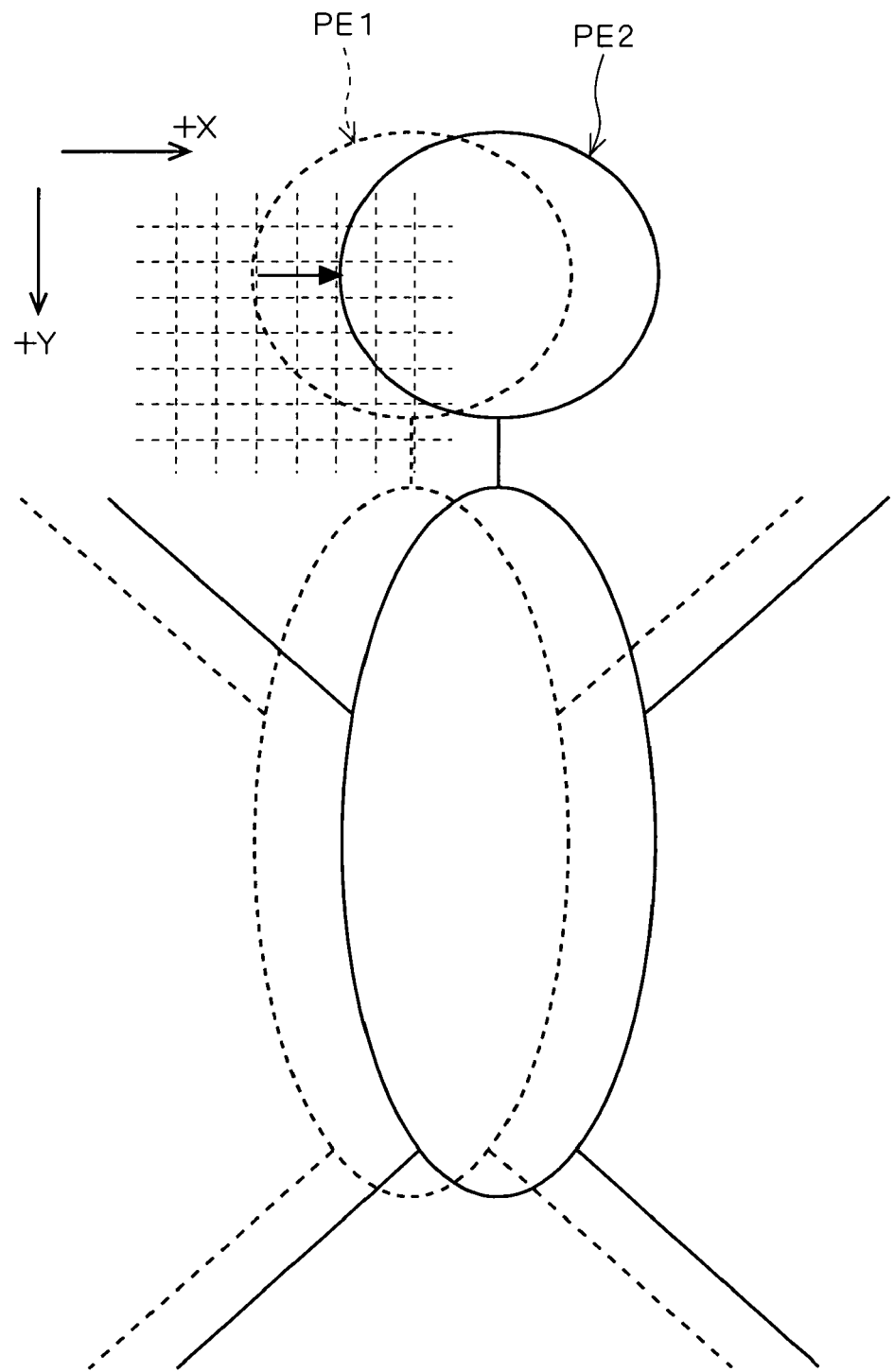
FIG. 9 is a diagram showing a state of a positional deviation.

FIG. 9 is a diagram illustrating an operation of detecting a movement amount of the subject due to a handshake. The case of detecting a positional deviation of the subject among the Bayer matrix images PA1 to PA4 by computing a positional deviation among component pixels of the same color component in a plurality of images will be described here. It is assumed that the positional deviation is detected on the basis of a comparing process between images of one color component (G component in this example) out of three comparing processes; a comparing process between images of the R component, a comparing process between images of the G component, and a comparing process between images of the B component. In other words, by obtaining a positional deviation in pixels of a single color component out of the plurality of color components, positional deviations among images are detected. According to the method, as compared with the case of detecting positional deviations on the basis of comparing processes of all of color components, the process load can be reduced. In particular, by performing the comparing process using the G (green) component, a positional deviation can be detected more accurately due to the visual sense characteristics of a human being.

In the following, a process for comparing the two images PE1 and PE2 to be compared will be described.

In a state where a plurality of combinations of deviation directions (orientations) and deviation amounts (strokes) between the two images PE1 and PE2 (initially, PA1 and PA2) to be compared are realized, a pattern matching process is performed.

Specifically, first, the image PE1 is shifted in the +X direction with respect to the image PE2 by an amount of two pixels, and the difference value between the pixel values of the corresponding pixels (G component pixels) after the shift is calculated. The difference value is computed with respect to all of G component pixels in a specific area (partial area) preset in the image, and a value obtained by adding the difference values on all of the G component pixels is computed as an evaluation value EV.

Next, the image PE1 is shifted in the −X direction by an amount of two pixels with respect to the image PE2, and a similar process is performed to calculate the evaluation value EV. The image PE1 is shifted in the +Y direction by an amount of two pixels with respect to the image PE2, and a similar process is performed to calculate the evaluation value EV. Further, the image PE1 is shifted in the −Y direction by an amount of two pixels with respect to the image PE2, and a similar process is performed to calculate the evaluation value EV.

Similarly, in a state where the image PE1 is shifted in each of the +X, −X, +Y, and −Y directions by an amount of four pixels, evaluation values EV corresponding to the "shifts" are computed.

In a state where the image PE1 is shifted in each of the +X, −X, +Y, and −Y directions by an amount of six pixels, evaluation values EV corresponding to the "shifts" are computed.

In a state where the image PE1 is shifted in each of the +X, −X, +Y, and −Y directions by an amount of eight pixels, evaluation values EV corresponding to the "shifts" are computed.

Similarly, in a state where the image PE1 is shifted in each of the +X, −X, +Y, and −Y directions by an amount of ten pixels, evaluation values EV corresponding to the "shifts" are computed.

In such a manner, the evaluation values EV corresponding to total 20 kinds of "shifts" are calculated. The best (smallest) evaluation value EV among the plurality of evaluation values is computed, and the "shift" corresponding to the best evaluation value EV is determined as the "shift" between the images PE1 and PE2. For example, if the evaluation value EV when the image PE1 is shifted in the +X direction by two pixels is the smallest, it is determined that the image PE2 is shifted in the +X direction by two pixels with respect to the image PE1.

After that, the images PE1 and PE2 to be compared are sequentially changed and similar operations are repeated, thereby computing a deviation between the images PA1 and PA3 (step SP22) and a deviation between the images PA1 and PA4 (step SP23).

Although the case of performing the pattern matching process on the combination of 20 kinds has been described above, the present invention is not limited to the case. The pattern matching process may be performed on the combination of larger number of kinds. For example, the image may be shifted in eight directions at intervals of 45 degrees. The shift amount may be sequentially changed not up to 10 pixels but to the larger number of pixels (such as tens pixels).

In step SP24, the four images PA1 to PA4 are added while compensating the positional deviation detected in steps SP21 to SP23, thereby generating a synthesized image PB (FIG. 8).

Concretely, to compensate a "deviation" from the reference image PA1, the other three images are moved with respect to the reference image, and the pixel values of corresponding pixels are added, thereby generating the synthesized image. For example, when the image PA2 is deviated from the image PA1 by two pixels in the +X direction, the image PA3 is deviated from the image PA1 by four pixels in the +X direction, and the image PA4 is deviated from the image PA1 by six pixels in the +X direction, the images PA2, PA3, and PA4 are shifted by two pixels in the –X direction, four pixels in the –X direction, and six pixels in the –X direction, respectively, from the image PA1 and, after that, pixels are added.

More specifically, to compensate the "positional deviation" calculated in step SP21, the images PA1 and PA2 are overlapped in a state where the image PA2 is displaced from the image PA1, pixel values of corresponding pixels are added pixel by pixel to generate an addition image PB12 (not shown), and the addition image PB12 is stored in the buffer memory 72. Both of the images PA1 and PA2 are Bayer matrix images. The images PA1 and PA2 are displaced on a two-pixel unit basis, and pixel values are added in a state where the pixels of the same color component (that is, pixels of the R component, pixels of the G component, and pixels of the B component) in the images PA1 and PA2 are associated with each other. The generated addition image PB12 is also a Bayer matrix image.

To compensate the "positional deviation" calculated in step SP22, the images PB12 and PA3 are overlapped in a state where the image PA3 is displaced from the addition image PB12, and pixel values of corresponding pixels are added pixel by pixel to generate an addition image PB13 (not shown). The images PB12 and PA3 as Bayer matrix images are added in a state where the pixels of the same color component are associated with each other. The addition image PB13 is also a Bayer matrix image.

To compensate the "positional deviation" calculated in step SP23, the images PB13 and PA4 are overlapped in a state where the image PA4 is displaced from the addition image PB13, and pixel values of corresponding pixels are added pixel by pixel to generate an addition image PB14 (also referred to as synthesized image PB). The images PB13 and PA4 as Bayer matrix images are added in a state where the pixels of the same color component are associated with each other. The addition image PB14 is also a Bayer matrix image.

The image adding process in steps SP22 and SP23 is executed by sequentially overlapping images PA3 and PA4 on the addition image (synthesized image) PB12 stored in the buffer memory 72. That is, the synthesized image is stored in the buffer memory 72 and is overwritten (updated).

After that, in step SP25, the interpolating process, γ correcting process, WB correcting process, noise reducing process, compressing process, and the like are performed in order on the synthesized image PB (addition image PB 14), thereby generating an RGB image PD (FIG. 8). The execution order of the interpolating process, γ correcting process, WB correcting process, noise reducing process, and the like is not limited to the above. The processes may be performed in an arbitrary order. For example, the order of the interpolating process and the γ correcting process may be reversed, or the order of the γ correcting process and the WB correcting process may be reversed. The RGB image PD is an image constructed by an R-component image DR, a G-component image DG, and a B-component image DB.

E. Comparative Example and Comparison Between the Comparative Example and the Preferred Embodiment of the Present Invention A handshake correcting control of a comparative example, and the difference between the comparative example of the handshake correcting control according to the preferred embodiment of the present invention will be described below with reference to FIGS. 11 and 12.

Figure 12:
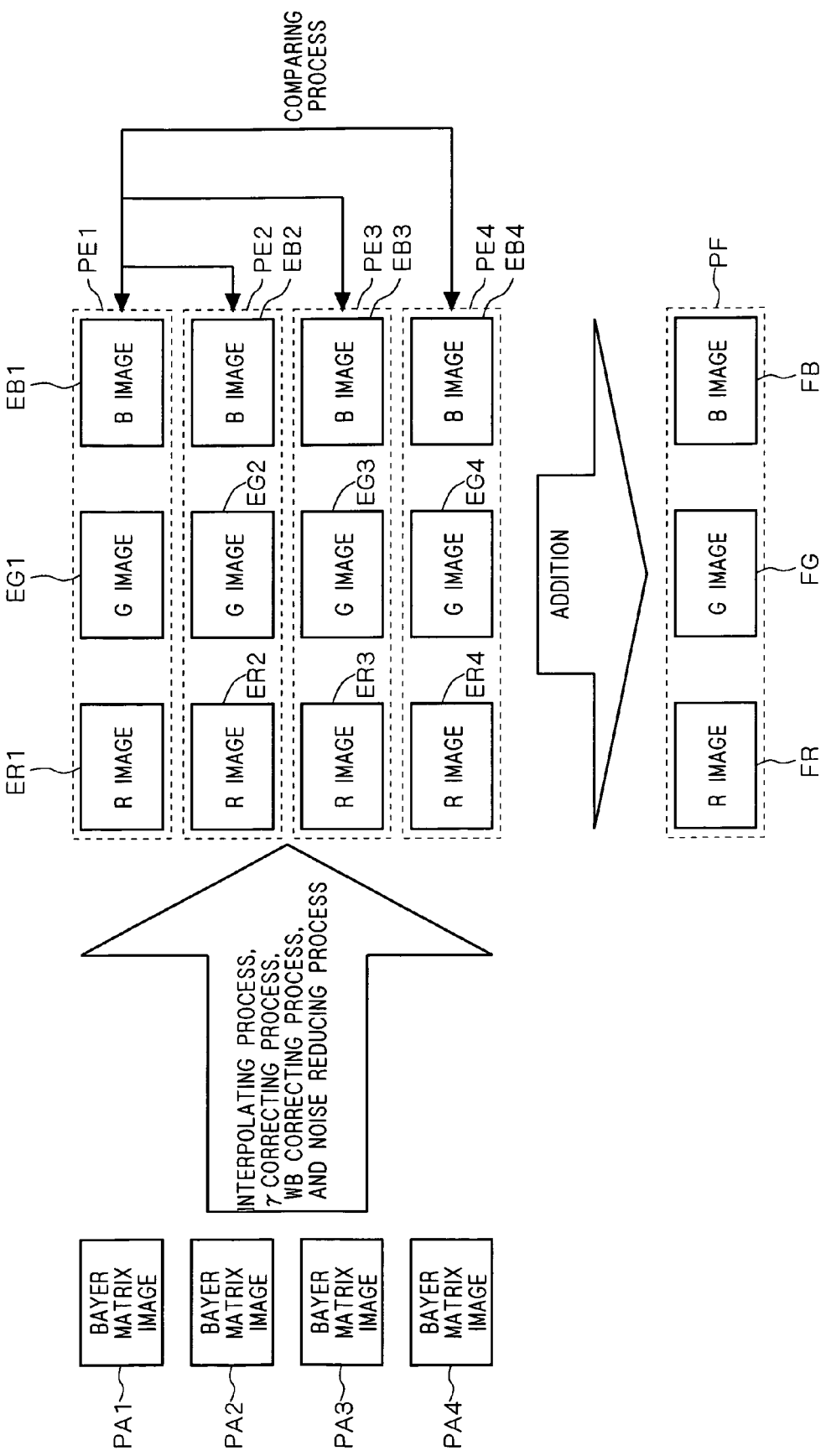
FIG. 12 is a conceptual diagram showing an outline of the handshake correcting control in the comparative example.

FIGS. 11 and 12 are diagrams showing the handshake correcting control according to the comparative example. FIG. 11 is a flowchart showing the detailed operation in the handshake correcting control, and FIG. 12 is a conceptual diagram showing operations of generating a synthesized image (RGB image) PF on the basis of the four images (Bayer matrix images) PA1 to PA4.

As shown in FIG. 11, first, the interpolating process is performed on each of the plurality of captured images (Bayer matrix images) PA1 to PA4 in steps SP31 to SP34, and the images PA1 to PA4 are converted to RGB images PE1 to PE4 (FIG. 12), respectively. At this time, the γ correcting process, the WB correcting process, and the noise reducing process are also executed on the RGB images PE1 to PE4.

The RGB image PE1 generated on the basis of the image PA1 is constructed by color component images of an R-component image ER1, a G-component image EG1, and a B-component image EB1. The RGB image PE2 generated on the basis of the image PA2 is constructed by color component images of an R-component image ER2, a G-component image EG2, and a B-component image EB2. Similarly, the RGB image PE3 is constructed by color component images of an R-component image ER3, a G-component image EG3, and a B-component image EB3. The RGB image PE4 is constructed by color component images of an R-component image ER4, a G-component image EG4, and a B-component image EB4.

In steps SP35 to SP37, positional deviations among the plurality of RGB images PE1 to PE4 are detected.

After that, in steps SP38 to SP40, processes for adding the RGB images PE1 to PE4 on the color component unit basis which is accompanied by compensation of the positional deviations among the plurality of RGB images PE1 to PE4, and generating a synthesized image (RGB image) PF (FIG.

12) are performed. The RGB image PF is an image constructed by an R-component image FR, a G-component image FG, and a B-component image FB. The R-component image FR is generated by a process for synthesizing the R-component images ER1 to ER4, the G-component image FG is generated by a process for synthesizing the G-component images EG0 to EG4, and the B-component image FB is generated by a process for synthesizing the B-component images EB1 to EB4.

The outline of the handshake correcting control of the comparative example has been described above.

In comparison with the comparative example, the handshake correcting control according to the aforementioned preferred embodiment has the following advantages.

First, in the comparative example, the interpolating process for decomposing each of the plurality of images (Bayer matrix images) PA1 to PA4 into color component images, thereby generating the RGB images PE1 to PE4. After that, the process for synthesizing the RGB images PE1 to PE4 on the color component unit basis is performed (refer to FIG. 12). More specifically, by the process for synthesizing the R-component images ER1 to ER4, the R-component image FR is generated. By the process for synthesizing the G-component images EG1 to EG4, the G-component image FG is generated. By the process for synthesizing the B-component images EB1 to EB4, the B-component image FB is generated. As described above, the synthesis process is performed on each of the three color components, the synthesis process is performed three times.

In contrast, in the handshake correcting control according to the aforementioned preferred embodiment, by adding the plurality of images (Bayer matrix images) PA1 to PA4 in a state before interpolation, the synthesized image PD is generated (refer to FIG. 8). Since the synthesis process is performed on the Bayer matrix images, it is sufficient to perform the synthesis process only once.

As described above, according to the aforementioned preferred embodiment, the load of the synthesis process can be reduced more than the comparative example.

In the comparative example, the interpolating process is performed on each of the plurality of images PA1 to PA4, so that the interpolating process is performed four times in total. On the other hand, in the aforementioned preferred embodiment, the interpolating process is performed only once on the synthesized image (addition image) PB, thereby generating the image PD having three color components. Therefore, according to the aforementioned preferred embodiment, the load in the interpolating process can be reduced more than the comparative example.

Further, in the comparative example, the γ correcting process, the WB correcting process, and the noise reducing process are performed one each of the plurality of images PA1 to PA4. On the other hand, in the aforementioned preferred embodiment, the γ correcting process, the white balance correcting process, and the noise reducing process are performed only on the single synthesized image PB. Therefore, in the aforementioned preferred embodiment, the load in the γ correcting process, the white balance correcting process, and the noise reducing process can be reduced more than the comparative example.

FIGS. 10A and 10B are diagrams showing a state where process time is reduced in accordance with such reduction in the process loads. FIG. 10A shows process time in the aforementioned preferred embodiment, and FIG. 10B shows process time in the comparative example.

FIG. 10B shows that conversion time Th from a Bayer matrix image to an RGB image is necessary for four images, positional deviation detection time Tr is necessary for three sets of images, and image synthesizing time Tc is necessary for three images.

In contrast, FIG. 10A shows that the positional deviation detection time Tr is necessary for three sets of images, the image synthesizing time Tc is necessary for one image, and the conversion time Th from a Bayer matrix image to an RGB image is necessary for one image.

When FIGS. 10A and 10B are compared with each other, it is understood that the total process time T1 (FIG. 10A) in the aforementioned preferred embodiment is shorter than the total process time T0 (FIG. 10B) of the comparative example (T1<T0).

As shown in FIGS. 10A and 10B, according to the aforementioned preferred embodiment, the total process time can be also reduced more than the comparative example.

In the comparative example, by the interpolating process on each of the plurality of images PA1 to PA4, 12 images ER1 to ER4, EG1 to EG4, and EB1 to EB4 (FIG. 12) are generated and temporarily stored in the buffer memory 71. After that, the image synthesis process is performed. Therefore, capacity for storing the 12 images is required as the capacity of the buffer memory 71.

On the other hand, the synthesis process is performed prior to the interpolating process in the aforementioned preferred embodiment. Consequently, the capacity for storing four Bayer matrix images PA1 to PA4 is sufficient as the capacity of the buffer memory 71.

It is therefore possible to reduce the capacity of the buffer memory 71.

In the positional deviation detection and the like of the aforementioned preferred embodiment, the positional deviation amount of a subject is detected on a two-pixel unit basis, and the minimum detection amount of a positional deviation amount is two pixels. Even in an optical-type handshake correction whose correction precision is generally higher than the image adding-type handshake correction, the minimum detection amount is often two pixels or larger. The minimum detection amount of two pixels is sufficient as the detection precision of handshake correction.

In the handshake correcting control (step SP16), the method of adding the Bayer matrix images is employed. Contrary, in the conventional image-adding-type handshake correcting technique, addition of RGB images is a well-employed method. Therefore, the method of adding Bayer matrix images which is accompanied by a correction of a positional deviation has been achieved uniquely by the present inventors and cannot be easily reached from technical common sense.

F. Modifications

Although the aforementioned preferred embodiment of the present invention has been described above, the present invention is not limited to the above description.

For example, in the aforementioned preferred embodiment, the case of sequentially comparing the images PA2, PA3, and PA4 with the image PA1 as a reference at the time of detecting a positional deviation among the plurality of images (refer to steps SP21 to SP23) has been described. However, the present invention is not limited to the case, and successive two images can be sequentially set as images to be compared. Specifically, a pattern matching process between the images PA1 and PA2, a pattern matching process between the images PA2 and PA3, and a pattern matching process between the images PA3 and PA4 are performed to compute deviation amounts. An image synthesis process for compensating the deviation amount is performed. In such a manner, a combined image may be generated.

Although the case of providing the buffer memory 72 for generating a synthesized image separately from the buffer memory 71 for temporarily storing an image has been described in the aforementioned preferred embodiment, the present invention is not limited to the case. Without providing the buffer memory 72, an area which becomes unnecessary in the buffer memory 71 may be used for generating a synthesized image. For example, the synthesized image PB12 of the images PA1 and PA2 may be stored in the area where the image PA2 was stored, and a process for synthesizing the other images PA3 and PA4 may be also performed in the area. Consequently, as the total capacity of the buffer memories 71 and 72, the capacity corresponding to the number of images to be added (in this case, four images) is sufficient.

Although the case of detecting a positional deviation of a subject caused by a handshake by using the plurality of images PA1 to PA4 has been described above in the aforementioned preferred embodiment, the present invention is not limited to the case. For example, a positional deviation may be detected by using a swing sensor of various sensors such as an angular speed sensor (gyro sensor) and an angular acceleration sensor. In this case, it is unnecessary to separately store a plurality of images for comparison. Therefore, a plurality of images accompanied by position compensation according to the detected positional deviation can be added on the same area in a memory. Thus, the capacity of a buffer memory for storing a plurality of images can be reduced.

Concretely, without providing the buffer memory 71, an image acquired by the image pickup device 5 may be directly transferred from the pre-process circuit 10 to the buffer memory 72 and sequentially store the images PA1 to PA4 in the buffer memory 72 which is accompanied by a positional deviation compensation. In this case, the capacity of one Bayer matrix image is sufficient as the total capacity of the buffer memories 71 and 72. Depending on response time of positional deviation detection by the swing sensor, the images may be temporarily transferred to the buffer memory 71 and, after that, added in the buffer memory 72. In this case as well, the capacity of two Bayer matrix images is sufficient as the total capacity of the buffer memories 71 and 72.

Although the case of generating a synthesized image based on the four images PA1 to PA4 has been described in the foregoing embodiment, the present invention is not limited to the case. It is sufficient to generate a synthesized image by using a proper number of images in consideration of the required processing speed, the degree of correction, and the like.

Further, although the case of executing all of processes in the handshake correcting control by the image capturing apparatus 1 has been described in the aforementioned preferred embodiment, the present invention is not limited to the case. For example, it is also possible to capture four Bayer matrix images by the image capturing apparatus 1 and execute the subsequent processes (for example, the processes in step SP16 and subsequent steps) by a computer such as a personal computer.

Concretely, a plurality of Bayer matrix images are successively acquired by the image capturing apparatus 1 (step SP15 in FIG. 6). After that, without performing the image synthesis process, the plurality of Bayer matrix images (RAW images) are recorded on the memory card 90. By an operation of the user, the Bayer matrix images recorded on the memory card 90 are read by a computer. In a computer storing a program capable of realizing a process similar to that in step SP16 (FIG. 6) in the aforementioned preferred embodiment, the program is executed and the read Bayer matrix images are designated as images to be processed, thereby realizing the handshake correcting process. The program may be provided by recording media of various kinds (such as a CD-ROM and a DVD-ROM) or downloaded from a server via a network.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus comprising:
an image pickup device in which photoelectric conversion elements corresponding to color components are arranged in a predetermined pattern such that each color component in a given row repeats every two pixels, said predetermined pattern corresponding to a first color layout of a first format in which a color image is generated by said image pickup device;
an acquisition unit that successively acquires a plurality of color images by using said image pickup device;
a detector that detects a positional deviation among said plurality of color images shifting each pixel of the image by an amount of two pixels;
a synthesis unit that compensates said positional deviation to synthesize said plurality of color images in said first format to form a synthesized image in said first format so that pixel values of said plurality of images are added in a state where the pixels of the same color component in said plurality of images are associated with each other; and
a converter that receives the synthesized image from the synthesis unit and performs a converting process for converting the synthesized image to a color image in a second format where the color image has a second color layout which is different from the first color layout, wherein each pixel of the second format has multiple color components.

2. The image capturing apparatus according to claim 1, further comprising:
an image processor that performs at least one of a γ correcting process, a white balance correcting process, and a noise reducing process on said synthesized image in said first format.

3. The image capturing apparatus according to claim 2, wherein
said plurality of images are acquired with exposure time of 1/f (where f denotes focal length (millimeter)) or less.

4. The image capturing apparatus according to claim 1, wherein
said detector detects a positional deviation among said plurality of images by comparing said plurality of images in said first format and computing a positional deviation of the pixels of the same color component in said plurality of images.

5. The image capturing apparatus according to claim 4, wherein
the positional deviation in said plurality of images is detected by obtaining a positional deviation of pixels of a single color component out of a plurality of color components of said photoelectric conversion elements.

6. The image capturing apparatus according to claim 5, wherein
said single color component is a green component.

7. The image capturing apparatus according to claim 4, wherein said plurality of images are acquired with exposure time of 1/f (where f denotes focal length (millimeter)) or less.

8. The image capturing apparatus according to claim 1, wherein said plurality of images are acquired with exposure time of 1/f (where f denotes focal length (millimeter)) or less.

9. The image capturing apparatus according to claim 1, wherein said detector has a swing sensor that detects movement of the image capturing apparatus.

10. A computer software product including a recording medium in which computer-readable software programs are recorded, said programs being configured to control a computer to perform the steps of:

(a) reading a plurality of color images successively captured by using an image pickup device, said image pickup device having photoelectric conversion elements corresponding to color components arranged in a predetermined pattern such that each color component in a given row repeats every two pixels;

(b) detecting a positional deviation among said plurality of images by shifting each pixel of the image by an amount of two pixels;

(c) compensating said positional deviation to synthesize said plurality of color images by addition to form a synthesized image in a state where the plurality of color images are in a first format having a first color layout in which the pixels are arranged in a predetermined pattern corresponding to the arrangement of photoelectric conversion elements in said image pickup device, wherein pixel values of said plurality of color images are added in a state where the pixels of the same color component in the plurality of color images are associated with each other; and (d) converting the synthesized image to a color image in a second format having a second color layout which is different from the first color layout, wherein each pixel of the second format has multiple color components.

11. The computer software product according to claim 10, wherein in said step (b), said positional deviation among said plurality of images is detected by a swing sensor that detects movement of the image capturing apparatus.

12. The computer software product according to claim 11, wherein in said step (b), said positional deviation among said plurality of color images is detected by comparing said plurality of images in said first format and computing a positional deviation of the pixels of the same color component in said plurality of images.

13. An image capturing apparatus for converting a color image in a first format where each pixel has only a single color component to a color image in a second format where each pixel has multiple color components comprising:

an image pickup device having photoelectric conversion elements corresponding to color components arranged in a predetermined pattern such that each color component in a given row repeats every two pixels, said predetermined pattern corresponding to the color arrangement of pixels in said first format;

an acquisition unit configured to utilize said image pickup device to successively acquire a plurality of images in said first format;

a detector configured to detect a positional deviation among said plurality of images in said first format by shifting each pixel of the image by an amount of two pixels;

a synthesis unit configured to utilize said positional deviation to synthesize said plurality of images by addition to form a synthesized image having pixels in said first format, wherein pixel values of said plurality of images are added in a state where the pixels of the same color component in the plurality of images are associated with each other; and an image processor configured to perform an interpolating process for converting said synthesized image from said first format to said second format.

14. The image capturing apparatus according to claim 13, wherein said first format is Bayer matrix image format and said second format is RGB image format.

* * * * *

UNITED STATES PATENT AND TRADEMARK OFFICE
CERTIFICATE OF CORRECTION

| | | |
|---|---|---|
| PATENT NO. | : 7,903,155 B2 | Page 1 of 1 |
| APPLICATION NO. | : 11/287934 | |
| DATED | : March 8, 2011 | |
| INVENTOR(S) | : Mikio Sakurai and Yoshihiro Hara | |

It is certified that error appears in the above-identified patent and that said Letters Patent is hereby corrected as shown below:

Column 16:
Line 4, claim 12, delete "claim 11," and insert -- claim 10, --.

Signed and Sealed this
Tenth Day of May, 2011

David J. Kappos
*Director of the United States Patent and Trademark Office*